J. B. MATTERN.
Improvement in Fences.

No. 128,409.

Patented June 25, 1872.

Witnesses.

Inventor.
John B. Mattern
per Edw. W. Donn

UNITED STATES PATENT OFFICE.

JOHN B. MATTERN, OF MATTERNSVILLE, PENNSYLVANIA.

IMPROVEMENT IN FENCES.

Specification forming part of Letters Patent No. 128,409, dated June 25, 1872.

*To all whom it may concern:*

Be it known that I, JOHN B. MATTERN, of Matternsville, in the county of Centre and State of Pennsylvania, have invented certain new and useful Improvements in Fences, which I denominate a "Self-sustaining and Portable Fence;" and the following is a specification thereof.

My invention consists of a fence composed of a series of tripods, constructed as hereafter described, to which the fence-rails are secured, whereby I am enabled to produce a fence that will sustain itself firmly upon the ground without the necessity of breaking the earth or boring post-holes, and which may be easily taken apart and carried to any point desired.

Figure 1:
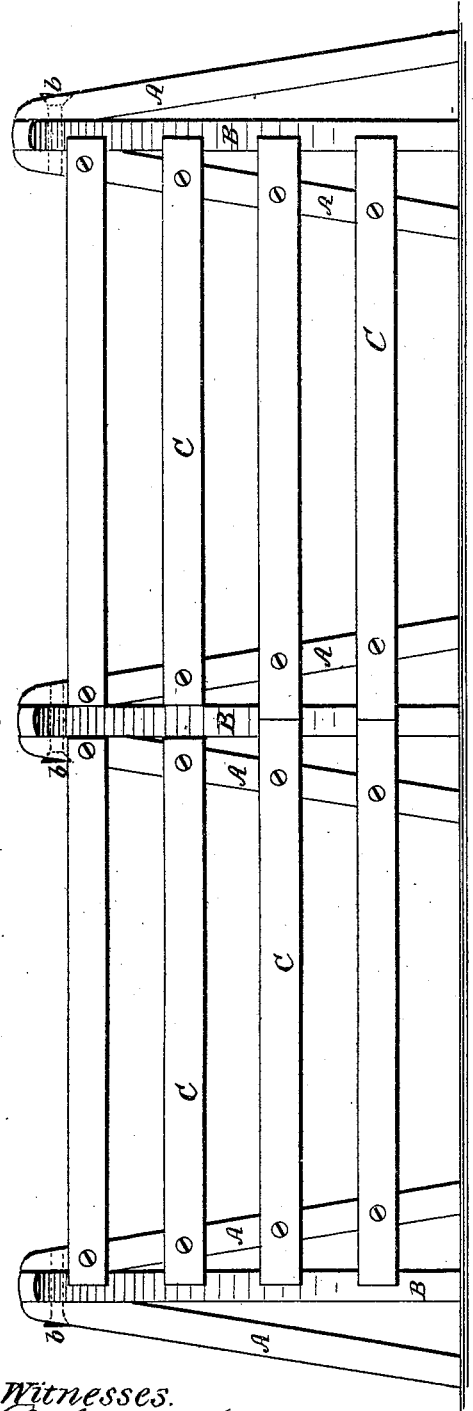
Figure 2:
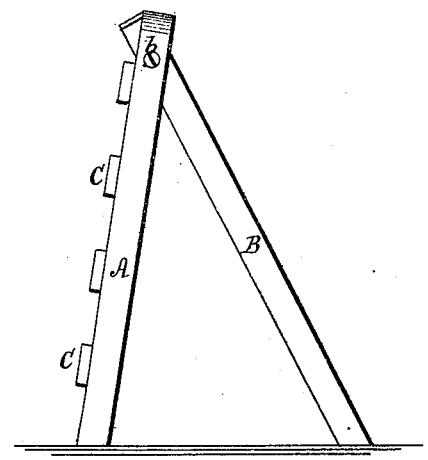

In the accompanying drawing, Figure 1 represents a front elevation of my improved self-sustaining and portable fence; and Fig. 2 represents a cross-section of the same, showing the arrangement of the bars of the tripods.

The bars A of the tripods, to which the rails C are secured, are inclined in opposite directions from each other, so that their junction with the rails will form an obtuse angle for the purpose of obtaining a firm rest and foothold upon the ground, while the brace-bar B of the tripods, which is hinged or pivoted at the top to and between the two diverging bars A, is of a length regulated to the height of the fence, being for the purpose of bracing the fence or acting as a buttress thereto. The ground ends of the bars A are beveled so that in their laterally-slanting positions they may have a firm support, while the long brace-bar B, being in a position at right angles to the line of the fence and pivoted by a bolt, $b$, to the diverging bars thereof at the top, the bottom end is also beveled to secure its hold upon the ground, and all the bars or posts are placed and secured upon the ground in such a manner that the fence shall incline slightly inward at the top, and thus the force of the fence inward and the force of the brace outward are neutralized and the fence kept firmly in position. The diverging bars are placed in the direction of the length of the fence so as to support the panels thereof; the brace-bar is then set in, so that the fence shall incline slightly toward it and rest upon the ground at a suitable distance from the fence to insure a proper bracing foot-hold. The three bars are then fastened by the bolt $b$, which acts as an axis for the brace-bar.

I usually make my fence five feet high; the diverging bars A are then about three feet apart on the ground, and the brace-bar rests upon the ground about three feet three inches from the fence in its rear.

It will be observed that all the bars meet together at the top, and, when braced together as hereinbefore described, form a substantial tripod to support the panels of the fence.

The advantages of my fence, in its cheapness, simplicity of construction, and capacity for being carried from one part of a farm to another, are so apparent as not to need further mention.

Having described my invention, I claim—

A self-sustaining portable fence, composed of panels supported by holding and bracing tripods, constructed essentially in the manner and for the purpose described.

The above specification of my improvement in fences signed this 28th day of March, 1872.

JOHN B. MATTERN.

Witnesses:
S. P. GRAY,
H. H. KRIDER.